June 8, 1937. C. ADLER, JR Re. 20,393

AIR COOLING ATTACHMENT FOR ELECTRIC FANS

Original Filed July 13, 1931

INVENTOR.

Charles Adler Jr.

BY Charles B. Mann Jr.

ATTORNEY.

UNITED STATES PATENT OFFICE 20,393

AIR COOLING ATTACHMENT FOR ELECTRIC FANS

Charles Adler, Jr., Baltimore, Md., assignor, by mesne assignments, to John Q. Sherman, Dayton, Ohio Original No. 1,874,843, dated August 30, 1932, Serial No. 550,474, July 13, 1931. Application for reissue January 24, 1934, Serial No. 708,168

1 Claim. (Cl. 62—129)

This invention relates to an air cooling attachment for electric fans and has for its object to provide an improved device that may readily be attached to electric fans whereby the air set in motion by the fan-blades will be directed through an improved cooling structure.

Another object is to provide an improved device of the character set forth whereby the same may be attached to fan-structures of either the stationary or oscillating types, so that in case of its attachment to the oscillating type of fan, it may oscillate with the fan.

The invention is illustrated in the accompanying drawing, wherein,—

Figure 1:
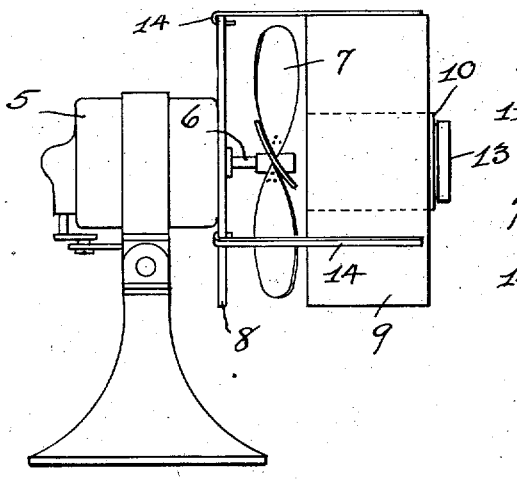
Fig. 1 shows an electric fan of the conventional oscillating type with my improved attachment connected thereto, the structure being shown in side elevation.
Figure 2:
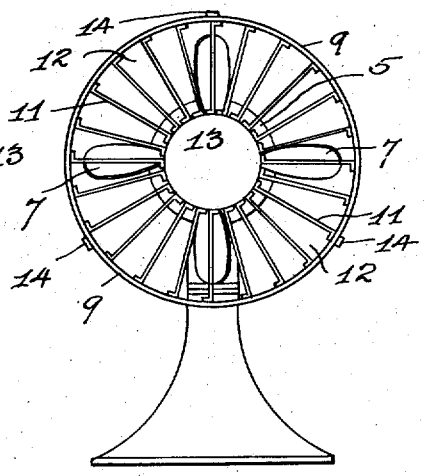
Fig. 2 illustrates the same in front elevation.
Figure 3:
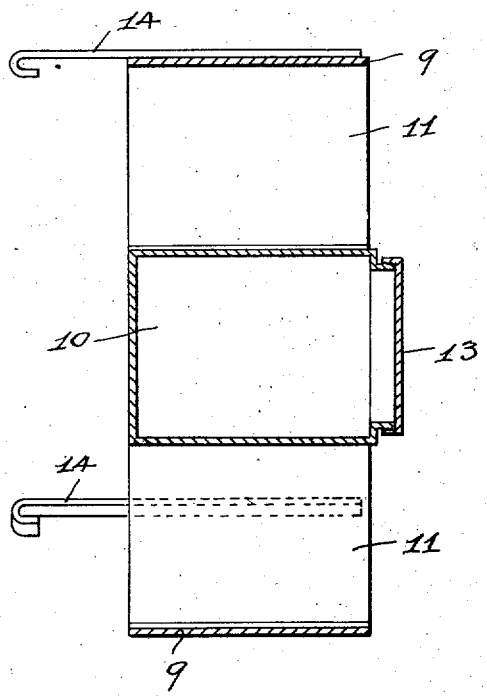
Fig. 3 shows the attachment on an enlarged scale and in vertical section.

Referring to the drawing, the numeral 5 designates a fan motor of conventional form in which the motor itself, the fan-shaft 6 and fan-blades 7 are all mounted so as to be oscillated with respect to the base.

An annular band or ring 8 is attached to the vertical face of the motor at the rear side of the fan-blades, and my improved structure is carried by said band or ring.

The improved structure consists of an annular shell 9 having a central receptacle or supply head 10 extending horizontally through the shell from front to rear.

This central receptacle 10 is of a considerably smaller diameter than the shell 9.

Between the outer wall of the central receptacle 10 and the inner wall of the outer shell I provide a series of radial partitions 11, the inner edges of which partitions are suitably secured to the receptacle wall while the outer edges thereof are attached to the outer shell.

The particular construction of these partitions 11 is not essential so long as their arrangement is such as to provide a series of metal surfaces extending between the inner receptacle and the outer shell and to form a series of air-passages 12 extending through the shell from the rear to the front and open at both rear and front, so that the air driven by the fan-blades may pass through said passages and out through the front ends thereof.

The central receptacle 10, in the present instance, has a screw-cap 13 at its outer or front end so the interior of the same may be accessible.

In the present instance, I provide a plurality of arms 14 which extend horizontally from the outer circumference of the shell 9 back past the fan-blades and engage the band or ring 8, whereby the shell with its central receptacle may be carried by said ring and held in front of the fan-blades.

The receptacle 10 is to contain a cooling medium, such as ice, which will be held therein by means of the cap 13; and the ice will cool the wall of the receptacle and, by conduction, the partition walls 11, so that the air passing through the passages 12, will be chilled when it is discharged at the front open ends of said passages.

The device may readily be attached to or detached from the fan structure so that loading the receptacle with ice or emptying water from the receptacle may be accomplished with ease.

Having described my invention, I claim:—

In an air-cooling attachment for electric fans the combination with a fan-structure including a supporting pedestal, a motor mounted at the top of the pedestal, and a rotary fan having radially disposed propeller type blades, of an annular shell concentrically disposed in spaced relation in front of the fan blades and open at both the front and rear sides thereof, a mounting ring carried by the supporting pedestal in concentric spaced relation at the rear of the fan blades, tie arms located exteriorly of the path of travel of the fan blades bridging the intervening space between the mounting ring and a central cooling receptacle in line with the axis of the fan-blades and within the annular shell, said receptacle having a movable cover at its front side and a series of radial partitions extending from the annular shell to the wall of the central cooling receptacle to support the latter and to form a series of passages through the shell around the cooling receptacle.

CHARLES ADLER, Jr.